(12) United States Patent
Miyano

(10) Patent No.: US 7,027,231 B2
(45) Date of Patent: Apr. 11, 2006

(54) ENDOSCOPE OBJECTIVE LENS

(75) Inventor: Hitoshi Miyano, Kumagaya (JP)

(73) Assignee: Fujinon Corporation, Saitama (JP)

( * ) Notice: Subject to any disclaimer, the term of this patent is extended or adjusted under 35 U.S.C. 154(b) by 78 days.

(21) Appl. No.: 10/774,412

(22) Filed: Feb. 10, 2004

(65) Prior Publication Data

US 2004/0160682 A1 Aug. 19, 2004

(30) Foreign Application Priority Data

Feb. 14, 2003 (JP) .............................. 2003-036924

(51) Int. Cl.
*G02B 21/02* (2006.01)
(52) U.S. Cl. ...................................... 359/661; 359/784
(58) Field of Classification Search ................ 359/661, 359/708–716, 753, 784
See application file for complete search history.

(56) References Cited

U.S. PATENT DOCUMENTS 5,119,238 A * 6/1992 Igarashi ...................... 359/714
5,359,456 A * 10/1994 Kikuchi ....................... 359/654
6,038,079 A * 3/2000 Michaels ..................... 359/661
6,256,155 B1 * 7/2001 Nagaoka ...................... 359/753

FOREIGN PATENT DOCUMENTS

| JP | 02-069710 | | 3/1990 |
| JP | 02-176612 | | 7/1990 |
| JP | 09-068647 | | 3/1997 |
| JP | 2003029142 A | * | 1/2003 |

* cited by examiner

*Primary Examiner*—Scott J. Sugarman
(74) *Attorney, Agent, or Firm*—Arnold International; Bruce Y. Arnold

(57) ABSTRACT

An endoscope objective lens with a three-group, three lens element construction, is formed of, in order from the object side, a first lens element having either a negative meniscus shape or a plano-concave shape with its concave surface on the image side, a stop, a positive second lens element having a plano-convex shape with its convex surface on the image side, and a positive third lens element having a plano-convex shape with its convex surface on the object side. The stop is positioned on or in contact with the object-side surface of the second lens element so that the endoscope objective lens is substantially telecentric. Specified conditions are satisfied in order to reduce aberrations and make the manufacture of the endoscope objective lens easier and less expensive.

8 Claims, 9 Drawing Sheets

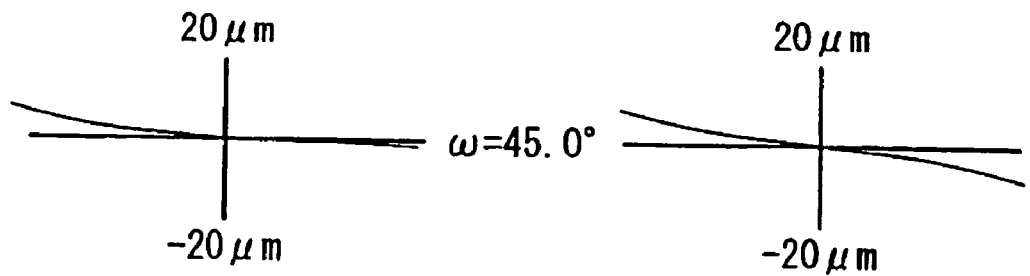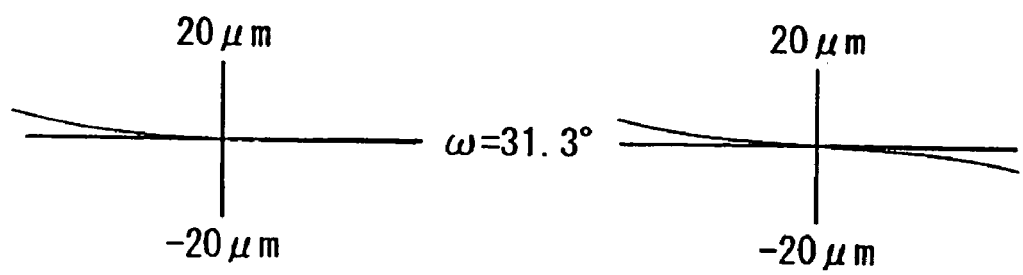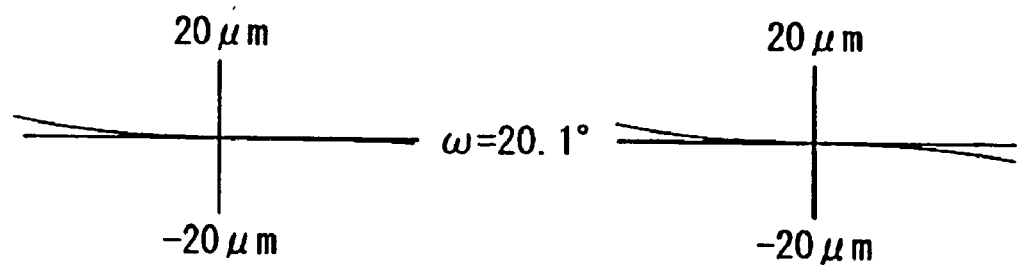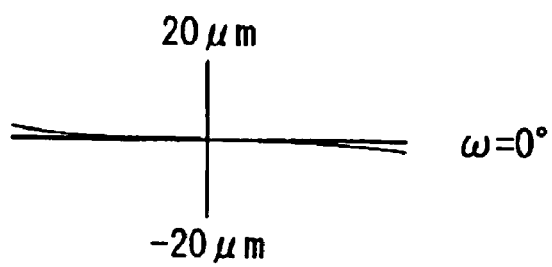
Fig. 3

Spherical Aberration

Astigmatism

Distortion

Lateral Color

ENDOSCOPE OBJECTIVE LENS

BACKGROUND OF THE INVENTION

Endoscopes are conventionally used at medical treatment facilities for observing or providing treatment within the body of a patient. The objective lens currently proposed for use in this type of endoscope has a back-focus of zero, with the image-side surface of the final lens element in contact with an end surface of a fiber optical bundle of an image guide, as in Japanese Laid-Open Patent Application H02-69710. However, in such a case, there is concern that the total length of the objective lens may become too long, making the endoscope difficult to operate. Therefore, an objective lens disclosed in, for example, Japanese Laid-Open Patent Application H02-176612 has been proposed as an objective lens with a short focus adjustment space. Further, the objective lens described in, for example, Japanese Laid-Open Patent Application H09-68647 discloses a compact, three lens element construction.

However, since the objective lens of the above-mentioned Japanese Laid-Open Patent Application H02-176612 has a comparatively large positive refractive power in the third lens element, an aspheric surface must be introduced in order to correct various aberrations such as coma and astigmatism, making it difficult to achieve a high precision due to problems in processing. On the other hand, with the objective lens described in the above-mentioned Japanese Laid-Open Patent Application H09-68647, correction of spherical aberration is not always sufficient due to the placement of the diaphragm and the amount of refractive power of the first lens element.

BRIEF SUMMARY OF THE INVENTION

The present invention relates to an endoscope objective lens that has a comparatively narrow diameter, provides high optical performance, and is compact.

BRIEF DESCRIPTION OF THE DRAWINGS

The present invention will become more fully understood from the detailed description given below and the accompanying drawings, which are given by way of illustration only and thus are not limitative of the present invention, wherein:

FIG. 3 shows the coma as a function of the field angle ω for the endoscope objective lens according to Embodiment 1;

DETAILED DESCRIPTION

Figure 1:
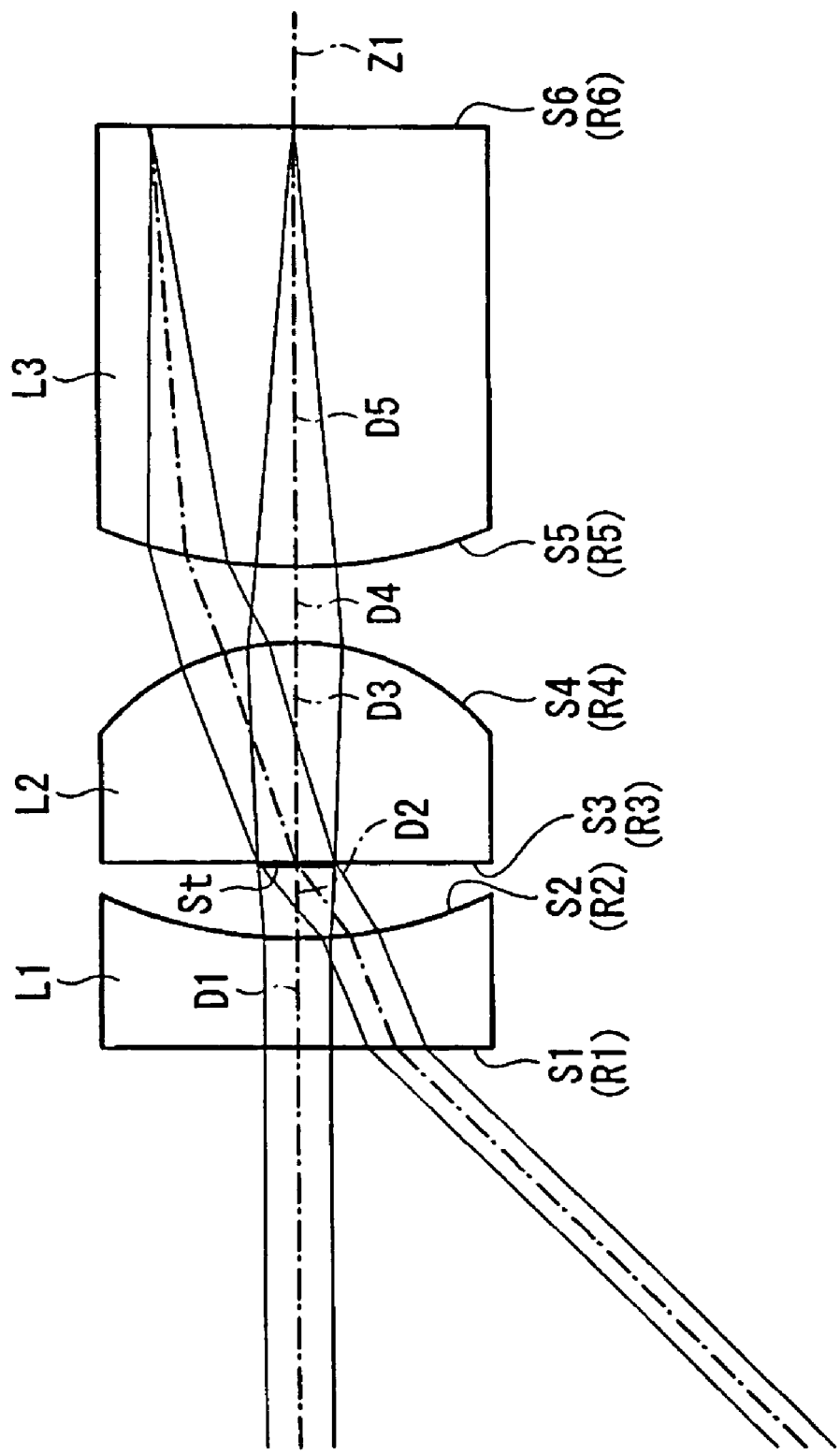
FIG. 1 shows a cross-section of the endoscope objective lens according to Embodiment 1.

The endoscope objective lens of the present invention has a three-group, three-element construction formed of, in order from the object side: a first lens element of negative refractive power and either a meniscus or a plano-concave shape with its concave surface on the image side; a stop; a second lens element of positive refractive power and a plano-convex shape with its convex surface on the image side; and a third lens element of positive refractive power and a plano-convex shape with its convex surface on the object side. The stop is positioned on or in contact with the object-side surface of the second lens element. In addition, the following Conditions (1)–(3) are satisfied:

$$2.00 < |f1/f| < 3.00 \qquad \text{Condition (1)}$$

$$2.50 < |f1/D2| < 7.50 \qquad \text{Condition (2)}$$

$$|D3/R4| < 1.00 \qquad \text{Condition (3)}$$

where $f1$ is the focal length of the first lens element;

$f$ is the focal length of the endoscope objective lens;

$D2$ is the on-axis spacing between the first lens element and the second lens element;

$D3$ is the center thickness of the second lens element; and $R4$ is the radius of curvature of the image-side surface of the second lens element.

By being formed in the manner described above, the objective lens of the present invention is both compact and provides favorable correction of various aberrations. By satisfying both Conditions (1) and (2), a sufficient angle of view can be assured while enabling distortion to be suppressed. By satisfying Condition (3), generation of coma is suppressed.

Moreover, with the objective lens according to the present invention, it is preferable that the image-side surface of the third lens element "makes contact with" the end surface of an optical fiber bundle or the end surface of an image detector that is arranged on the image side of the objective lens. The expression "makes contact with" is herein defined as including the situation of the image-side surface of the third lens element making contact via a protective layer, such as a cover glass, or the like.

It is preferable that the objective lens according to the present invention also satisfies the following Condition (4):

$$nd1 > 1.80 \qquad \text{Condition (4)}$$

where nd1 is the refractive index of the first lens element at the d-line (587.6 nm).

By using an optical glass with a high index of refraction that satisfies Condition (4), the refractive power required for the first lens element can be maintained the same even though the radius of curvature of the concave lens element surface on the image-side is increased.

It is preferable that the objective lens according to the present invention have the first lens element, in order from the object side, be molded of either glass or plastic. By this, a minute and highly precise first lens element having a plano-concave shape or a negative meniscus shape can be more easily provided.

In addition, it is preferable that the second lens element and third lens element of the endoscope objective lens according to the present invention have their convex surfaces be spherical in shape and be formed by grinding. In this manner, minute and high-precision second and third lens elements having a plano-convex shape can be more easily obtained.

Figure 4:
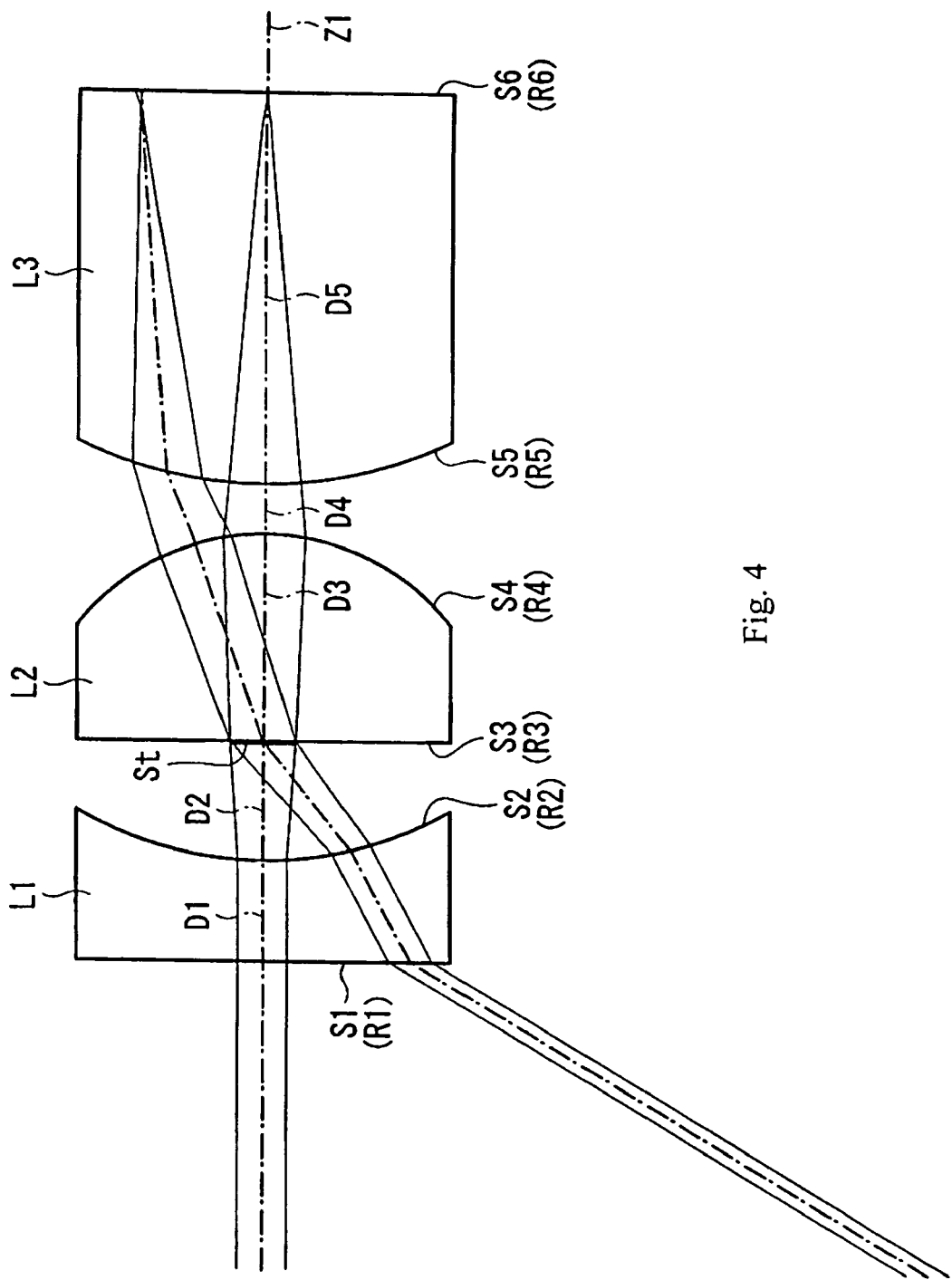
FIG. 4 shows a cross-section of the endoscope objective lens according to Embodiment 2.

A general description of the endoscope objective lens of the present invention that pertains to both embodiments of the invention will first be described with reference to FIG. 1 that shows Embodiment 1 and with reference to FIG. 4 that shows Embodiment 2. In FIGS. 1 and 4, lens elements are referenced by the letter L followed by a number denoting their order from the object side of the endoscope objective lens along the optical axis Z1, from L1 to L3. Similarly, the radii of curvature of the lens element surfaces are parenthetically referenced by the letter R followed by a number denoting their order from the object side of the endoscope objective lens, from (R1) to (R6). The on-axis surface spacings along the optical axis Z1 of the various optical surfaces are referenced by the letter D followed by a number denoting their order from the object side of the endoscope objective lens, from D1 to D5.

The endoscope objective lens of the present invention has a comparatively small size. For example, the outer diameter Φ of the endoscope objective lens is 1.0 mm or less, and the endoscope objective lens has a three group, three lens element construction. More specifically, the endoscope objective lens is formed of, in order from the object side along the optical axis Z1, a first lens element L1 of negative refractive power, a second lens element L2 of positive refractive power, and a third lens element L3 of positive refractive power. As described above, a diaphragm stop St is arranged on or in contact with the object-side surface of the second lens element L2. Furthermore, an end face (not shown in the drawing) of an optical fiber bundle such as an image guide fiber or the like for leading the luminous flux to the eyepiece of the endoscope may be arranged at the image surface of the endoscope objective lens. Alternatively, an image detector (not shown) such as a CCD (Charge Coupled Device) with protective cover glass can be positioned at the image surface of the endoscope objective lens. Moreover, all of the optical surfaces (i.e., the surfaces which transmit luminous flux) are constructed as either spherical or planar surfaces, and each lens element is formed of optical material having a substantially uniform distribution of index of refraction.

The first lens element L1 of negative refractive power has either a plano-concave shape or a meniscus shape with its concave surface on the image side. The first lens element L1 is preferably formed by a molding process. The second lens element L2 has positive refractive power and a plano-convex shape with its convex surface on the image side. Furthermore, the third lens element L3 has positive refractive power and a plano-convex shape with its convex surface on the object side. It is preferable that the image-side surface S6 of the third lens element L3 makes contact with the end face of the optical fiber bundle or the cover glass of the image detector, as described above. In addition, the second and third lens elements L2 and L3 preferably have spherical surfaces that have been formed by grinding.

This endoscope objective lens is constructed so as to satisfy the above Conditions (1)–(3), and preferably, also satisfies the above Condition (4). A description will be given hereafter of the operation and efficacy of the endoscope objective lens.

Since this endoscope objective lens has a simple construction using only three lens elements L1 through L3 and also satisfies Conditions (1) through (3), it has the ability to favorably correct various aberrations while achieving compactness. Further, since each of the surfaces S1–S6 is planar or spherically shaped, high precision processing of the surfaces can be easily provided. In addition, by arranging a diaphragm stop St on or in contact with the object-side surface S3 of the second lens element L2, the incident ray direction onto the image surface can be made to be nearly parallel to the optical axis Z1. Thus, by having the endoscope objective lens be substantially telecentric, suppression of loss of light during passage through the optical fiber of the image guide becomes possible. Moreover, the endoscope objective lens produces incidence angles onto the detecting surface of an image detector that are substantially parallel to a line drawn normal to the detecting surface of the image detector, thus enabling the quantity of light from the object to be efficiently detected.

Condition (1) stipulates the ratio of the focal length f1 of the first lens element L1 divided by the focal length f of the endoscope objective lens. By satisfying this Condition (1), an appropriate power range of the first lens element L1 is assured.

Condition (2) stipulates the ratio of the focal length f1 of the first lens element divided by the on-axis spacing D2. By satisfying Condition (2), an appropriate range of on-axis spacing D2 is assured. If the upper limit of Condition (1) is exceeded, or if the upper limit of Condition (2) is exceeded, the power of the first lens element will be insufficient, thereby making it difficult to obtain a sufficient angle of view. On the other hand, if the lower limit of Condition (1) is not satisfied or if the lower limit of Condition (2) is not satisfied, distortion becomes difficult to suppress.

Condition (3) stipulates the ratio of the central thickness D3 of the second lens element L2 divided by the radius of curvature R4 of the image-side surface S4 of the second lens element L2. If the center thickness D3 and the radius of curvature R4 are made to be equal when the diaphragm stop St is placed on or in contact with the surface S3, in other words, when |D3/R4| equals 1, the main beam of luminous flux entering from the surface S3 enters orthogonally to the surface S4. Here, if |D3/R4| is made to be greater than 1, in other words, when exceeding the upper limit of Condition (3), the oblique ray is drastically refracted at the surface S4, which causes coma to be generated. However, by satisfying Condition (3), the generation of coma can be controlled.

In addition, the endoscope objective lens of the present invention is constructed, for ease of manufacture, by chronologically inserting within a lens element barrel a first lens element L1, a spacer, a diaphragm stop St, a second lens element L2, a spacer, and a third lens element L3. In the case of constructing the endoscope objective lens in this manner, the third lens element L3 must be fixed in place. A conventional method of fixing the position of the third lens element is to use a retaining ring that presses against the lens surface near its periphery and is attached to the lens barrel; however, since the back focus is zero with this imaging lens element, it can be fixed in position by having the image-side surface S6 of the third lens element L3 make contact with the end face of the optical fiber bundle or with the cover glass of the image detector, as described above. This enables the third lens element L3 to be fixed in position without requiring a retaining ring, thereby enabling the full area of the lens surface to pass light flux while preventing an increase of the lens element outer diameter, as would be required if a retaining ring were to be used without eclipsing a part of the available light flux.

Condition (4) stipulates the refractive index of the glass material used in the first lens element L1. The first lens element L1, as described above, requires the power stipulated according to Condition (1), and as one conceivable method thereof, for instance, the radius of curvature R2 of the surface S2 can be made smaller. However, if the radius of curvature R2 is made to be too small, then not only is the generation of aberrations made easier, but there is the risk of not being able to secure the size of the required effective diameter. For this reason, by using glass material which has a high refractive index that satisfies Condition (4), the power of the first lens element L1 can be easily obtained as stipulated by Condition (1) without making the radius of curvature R2 too small. Furthermore, increasing to a certain extent the radius of curvature R2 of the surface S2 which is concave is beneficial in that it allows greater ease of processing.

Since the endoscope objective lens of the present embodiment is extremely minute in size, production using normal formation methods is very difficult. Suppressing a small centering error is especially difficult with the first lens element L1 having a concave-shaped surface S2, for instance, when using what is known as the bell clamp method to perform centering by pushing a chuck on both sides of the lens element. For this reason, the first lens element L1 is preferably a molded lens element formed from a mold that uses heat resistant ceramic or the like. In this case, it is particularly desirable that a glass molded lens element be used, but a plastic molded lens element may also be used. On the other hand, the second lens element L2 and the third lens element L3 that do not have a concave surface are preferably formed by grinding each from a ball lens element, as follows. A ball lens element having a prescribed outer diameter is ground so as to have a desired central thickness, and the lens element having the desired central thickness is centered so as to have a desired outer diameter.

In this manner, the endoscope objective lens of the present invention provides a compact, substantially telecentric construction with favorable correction of aberrations and a sufficiently wide angle of view. In addition, since the endoscope objective lens of the present invention does not use any aspheric surfaces, the lens element surfaces can be easily manufactured. Because the endoscope objective lens is substantially telecentric, loss of light when conveying an image using a light guide is reduced and the efficiency in detecting images is enhanced.

Two embodiments of the invention will now be described in detail.

Embodiment 1

FIG. 1 is a cross-section that illustrates the lens element configuration according to Embodiment 1 of the present invention.

Table 1 below lists the surface number #, in order from the object side, the radius of curvature R (in mm) of each surface, the on-axis surface spacing D (in mm) between surfaces, as well as the refractive index $N_d$ and the Abbe number $v_d$ (both at the d-line of $\lambda$=587.6 nm) of each lens element of Embodiment 1. In the bottom portion of the table are listed the focal length and the object distance (as measure from the object to surface #1 S1) of the endoscope objective lens of this embodiment.

TABLE 1

| # | R | D | $N_d$ | $v_d$ |
|---|---|---|---|---|
| 1 | ∞ | 0.2750 | 1.90680 | 21.2 |
| 2 | 1.1000 | 0.1860 | | |
| 3 | ∞ | 0.5500 | 1.88300 | 40.9 |
| 4 | −0.6200 | 0.1920 | | |
| 5 | 1.2370 | 1.1506 | 1.88300 | 40.9 |
| 6 | ∞ | | | | f = 0.5 mm
Object distance = 10 mm

Figure 2:
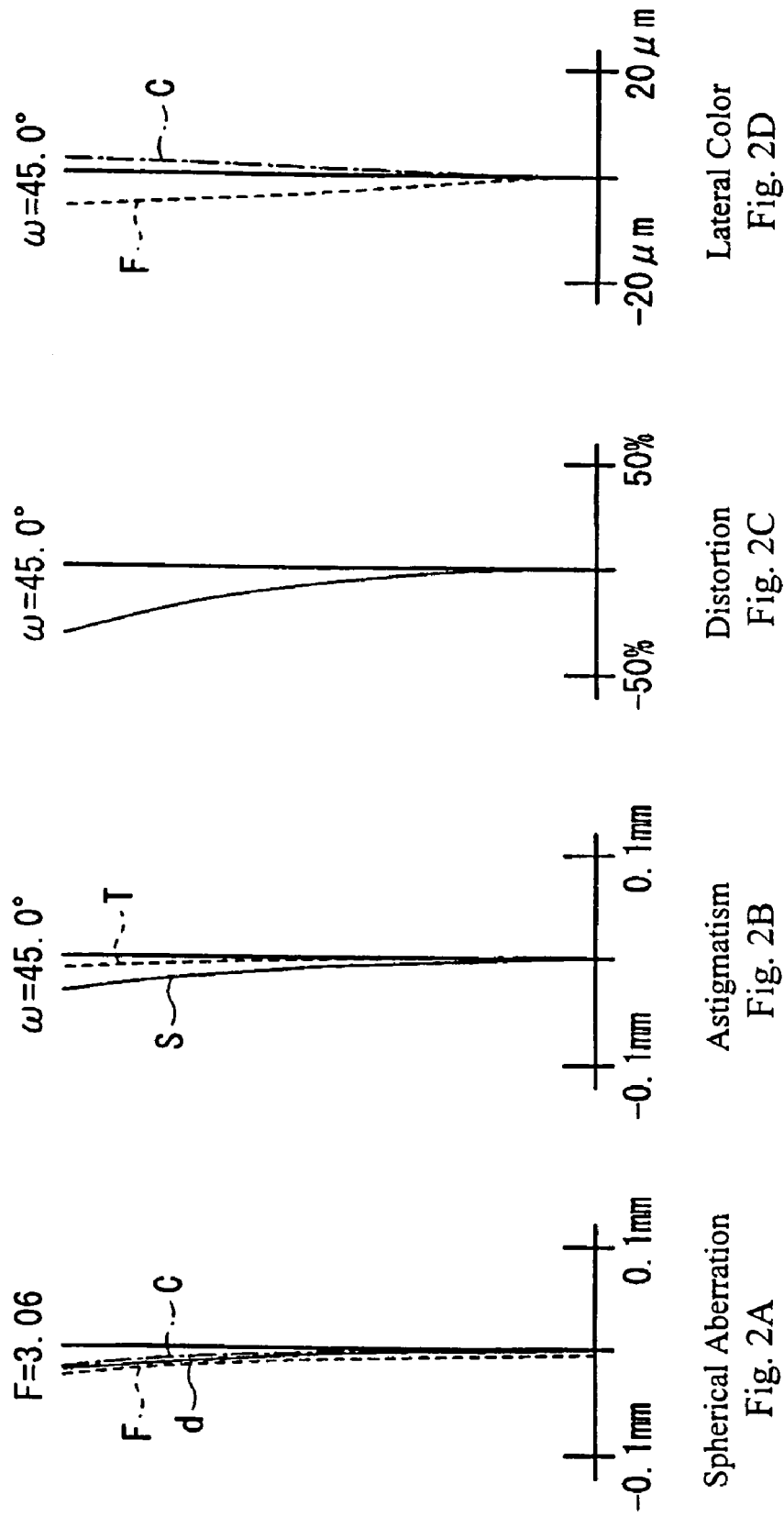
FIGS. 2A–2D show the spherical aberration, astigmatism, distortion, and lateral color, respectively, of the endoscope objective lens according to Embodiment 1.

FIGS. 2A–2D show the spherical aberration, astigmatism, distortion, and lateral color, respectively, for the endoscope objective lens of Embodiment 1. Each figure indicates the aberration for the d-line as the standard wavelength, and FIGS. 2A and 2D also indicate the specified aberration for the F-line (wavelength: 486.1 nm) and the C-line (wavelength: 656.3 nm). In FIG. 2B, the astigmatism is shown for both the sagittal S and the tangential T image planes.

FIG. 3 shows the coma at half-field angles ω of 0, 20.1, 31.3 and 45.0 degrees, for both the tangential image plane (left column) and the sagittal image plane (right column), for Embodiment 1. The vertical axis dimension for each curve is in μm. As the coma on axis (ω=0°) is the same for both the tangential and sagittal image planes, only the curve for the tangential image plane is illustrated in the bottom row of the figure. Moreover, the standard wavelength for each aberration curve is the d-line.

Embodiment 2

FIG. 4 is a cross-section that illustrates the lens element configuration according to Embodiment 2 of the present invention.

Table 2 below lists the surface number #, in order from the object side, the radius of curvature R (in mm) of each surface, the on-axis surface spacing D (in mm) between surfaces, as well as the refractive index $N_d$ and the Abbe number $v_d$ (both at the d-line of $\lambda$=587.6 nm) of each lens element of Embodiment 2. In the bottom portion of the table are listed the focal length and the object distance (as measure from the object to surface #1 S1) of the endoscope objective lens of this embodiment.

TABLE 2

| # | R | D | $N_d$ | $v_d$ |
|---|---|---|---|---|
| 1 | ∞ | 0.3350 | 1.90680 | 21.2 |
| 2 | 1.1720 | 0.3930 | | |
| 3 | ∞ | 0.6700 | 1.88300 | 40.9 |
| 4 | −0.7530 | 0.1670 | | |
| 5 | 1.3390 | 1.3621 | 1.88300 | 40.9 |
| 6 | ∞ | | | | f = 0.5 mm
Object distance = 10 mm

Figure 5:
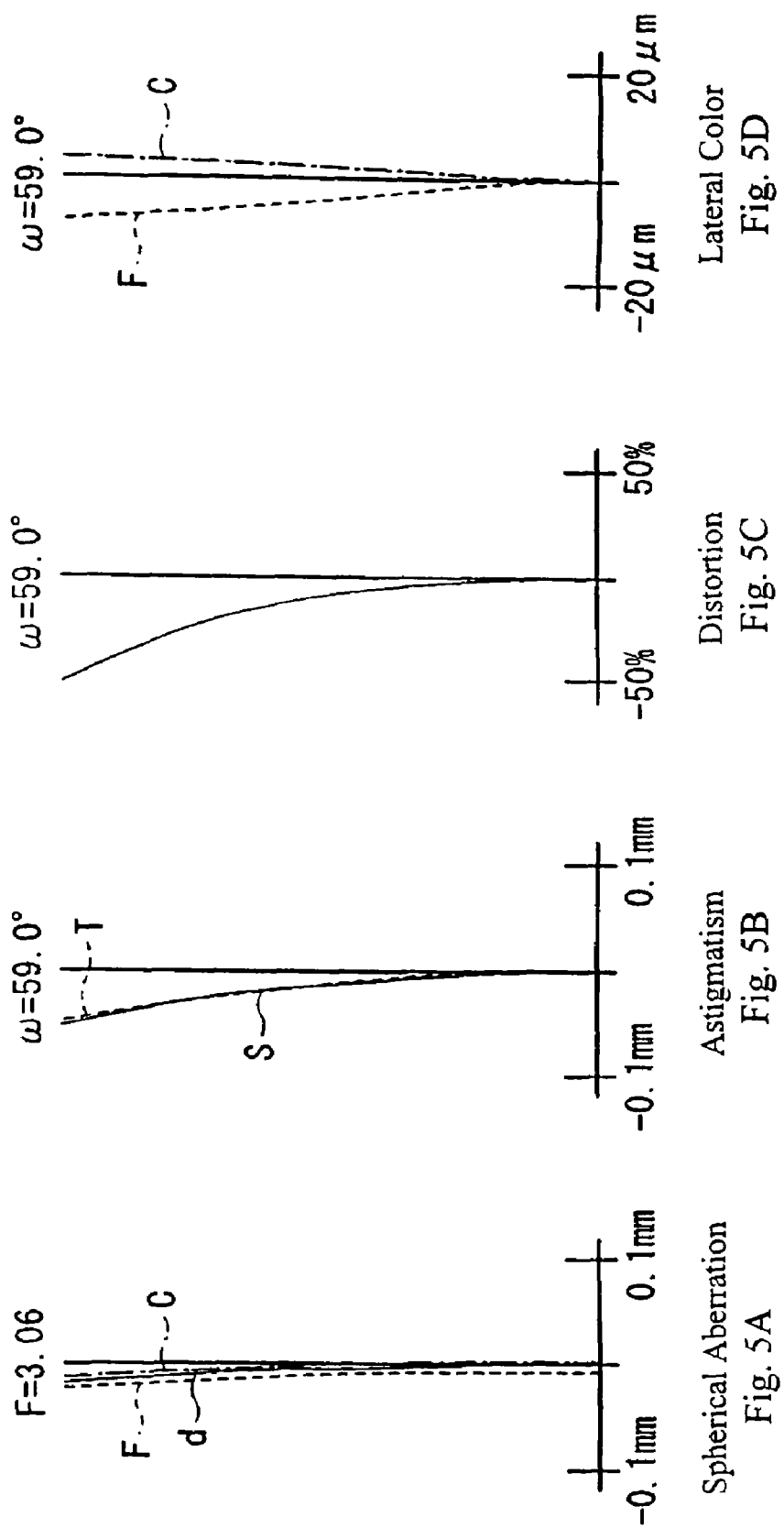
FIGS. 5A–5D show the spherical aberration, astigmatism, distortion, and lateral color, respectively, of the endoscope objective lens according to Embodiment 2.

FIGS. 5A–5D show the spherical aberration, astigmatism, distortion, and lateral color, respectively, for the endoscope objective lens of Embodiment 2. Each figure indicates the aberration for the d-line as the standard wavelength, and FIGS. 5A and 5D also indicate the specified aberration for the F-line (wavelength: 486.1 nm) and the C-line (wavelength: 656.3 nm). In FIG. 5B, the astigmatism is shown for both the sagittal S and the tangential T image planes.

Figure 6:
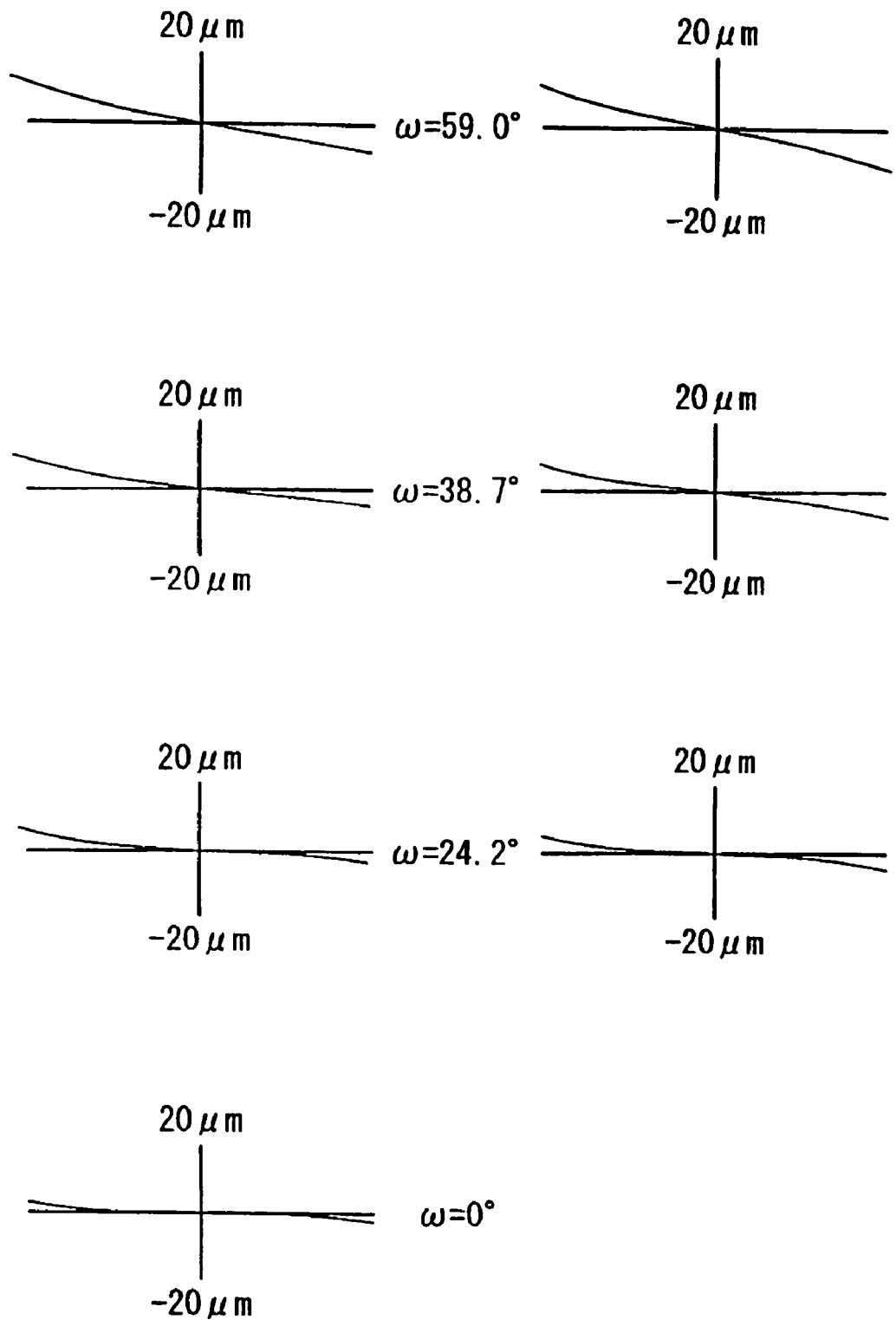
FIG. 6 shows the coma as a function of the field angle ω for the endoscope objective lens according to Embodiment 2.

FIG. 6 shows the coma at half-field angles ω of 0, 24.2, 38.7 and 59.0 degrees, for both the tangential image plane (left column) and the sagittal image plane (right column), for Embodiment 2. The vertical axis dimension for each curve is in μm. As the coma on axis (ω=0°) is the same for both the tangential and sagittal image planes, only the curve for the tangential image plane is illustrated in the bottom row of the figure. Moreover, the standard wavelength for each aberration curve is the d-line.

Table 3 below lists, for each embodiment, the angle of view 2ω, the image height h (in mm), the effective f-number $F_{NO}$, the stop diameter SD (in mm), and the computed values that correspond to Conditions (1)–(3). Moreover, in order to make an easier comparison, for each embodiment, the focal length f for the endoscope objective lens is 0.5 mm while the distance between the object and the object-side surface S1 of the first lens element is 10 mm.

TABLE 3

|  | Embodiment 1 | Embodiment 2 |
|---|---|---|
| Angle of View 2ω | 90.09° | 118.07° |
| Image height h | 0.347 mm | 0.410 mm |
| Effective $F_{NO}$ | 3.058 | 3.063 |
| Stop Diameter SD | 0.190 mm | 0.214 mm |
| Condition (1): \|f1/f\| | 2.423 | 2.586 |
| Condition (2): \|f1/D2\| | 6.522 | 3.289 |
| Condition (3): \|D3/R4\| | 0.887 | 0.890 |

As shown in Table 3 above, each of Embodiments 1 and 2 satisfies Conditions (1)–(3). Furthermore, as can be seen in Tables 1 and 2 above, the refractive index nd1 of the first lens element in Embodiments 1 and 2 are both 1.90680, thereby satisfying Condition (4).

As can be understood from each of the aberration diagrams, and Tables 1–3, Conditions (1)–(4) are satisfied and the various aberrations are favorably corrected for each embodiment, thereby enabling the comparatively easy realization of a more compact construction while securing a sufficient angle of view 2ω.

PRIOR ART COMPARATIVE EXAMPLE

Figure 7:
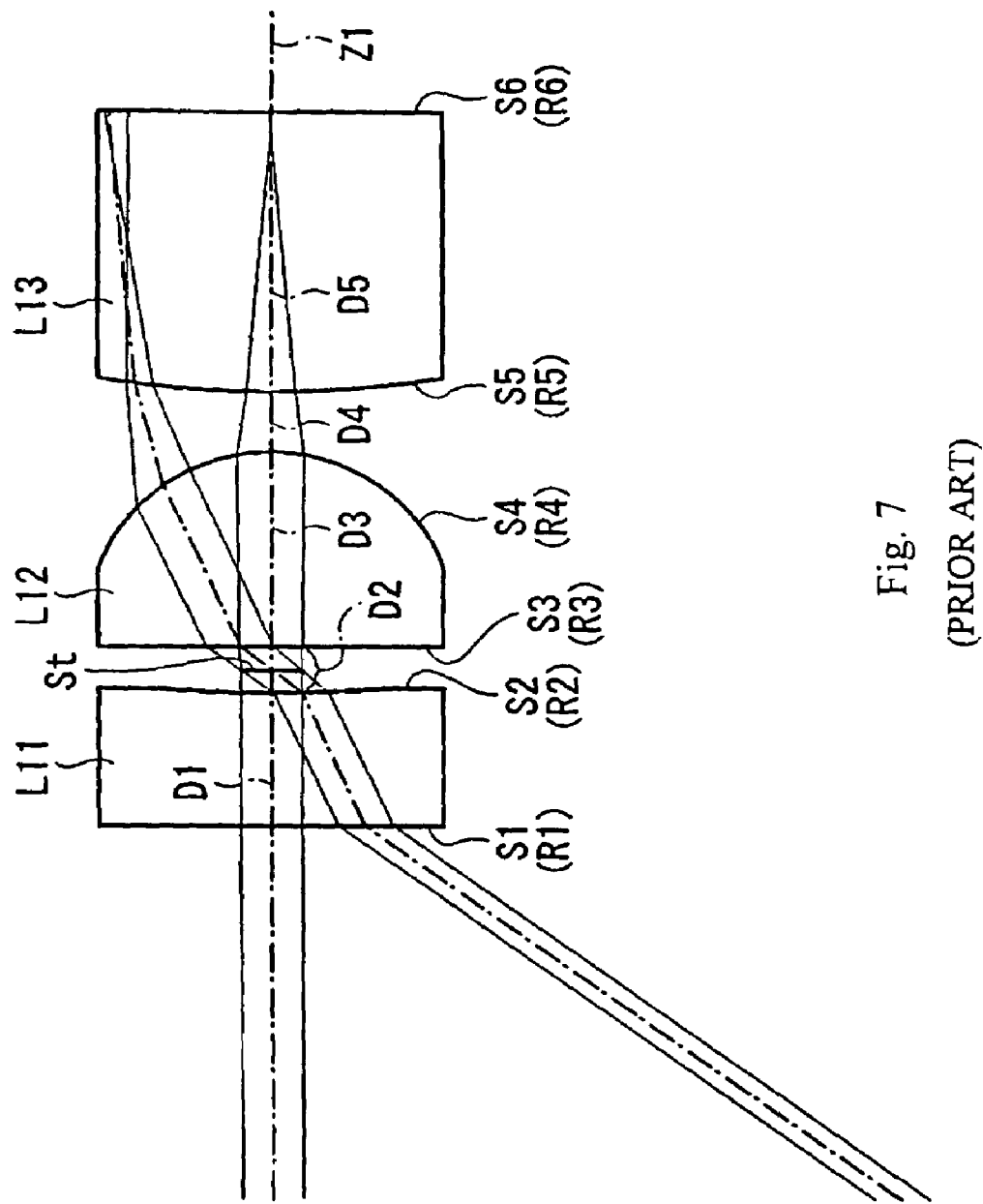
FIG. 7 is a cross-section of an endoscope objective lens of a first comparative example.

A description of a conventional endoscope objective lens will now be provided in order to serve as a comparative example for comparison with the endoscope objective lens of the present invention. FIG. 7 shows the lens element configuration of such a conventional endoscope objective lens. The first lens element L11 through the third lens element L13 in the endoscope objective lens of the comparative example correspond to the first lens element L1 through the third lens element L3 in the endoscope objective lens of Embodiments 1 and 2 (FIG. 1 and FIG. 4) that relate to the present invention.

Table 4 below lists the surface number #, in order from the object side, the radius of curvature R (in mm) of each surface, the on-axis surface spacing D (in mm) between surfaces, as well as the refractive index $N_d$ and the Abbe number $v_d$ (both at the d-line of λ=587.6 nm) of each lens element of this prior art comparative example. In the bottom portion of the table are listed the focal distance f and the object distance (as measure from the object to surface #1, S1) of the endoscope objective lens according to this prior art comparative example.

TABLE 4

| # | R | D | $N_d$ | $v_d$ |
|---|---|---|---|---|
| 1 | ∞ | 0.3492 | 1.88300 | 40.9 |
| 2 | 4.0955 | 0.1222 |  |  |
| 3 | ∞ | 0.5237 | 1.88300 | 40.9 |
| 4 | −0.4818 | 0.1571 |  |  |
| 5 | 2.6186 | 0.7408 | 1.72916 | 54.7 |
| 6 | ∞ |  |  |  | f = 0.5 mm
Object distance = 10 mm

As illustrated in FIG. 7, in this Comparative Example, the diaphragm stop St is positioned between the first lens element L11 and the second lens element L12.

Table 5 below lists the angle of view 2ω, the image height h (in mm), the effective f-number $F_{NO}$, the stop diameter SD (in mm), and the computed values that correspond to Conditions (1)–(3). Moreover, in order to make an easier comparison, the focal length f for the endoscope objective lens of this comparative example is again 0.5 mm while the distance between the object and the object-side surface S1 of the first lens element is again 10 mm.

TABLE 5

| Angle of View 2ω | 105.26° |
|---|---|
| Image height h | 0.420 |
| Effective $F_{NO}$ | 3.130 |
| Stop Diameter SD | 0.160 mm |
| Condition (1): \|f1/f\| | 9.277 |
| Condition (2): \|f1/D2\| | 37.956 |
| Condition (3): \|D3/R4\| | 1.087 |

Figures 8A, 8B, 8C, 8D:
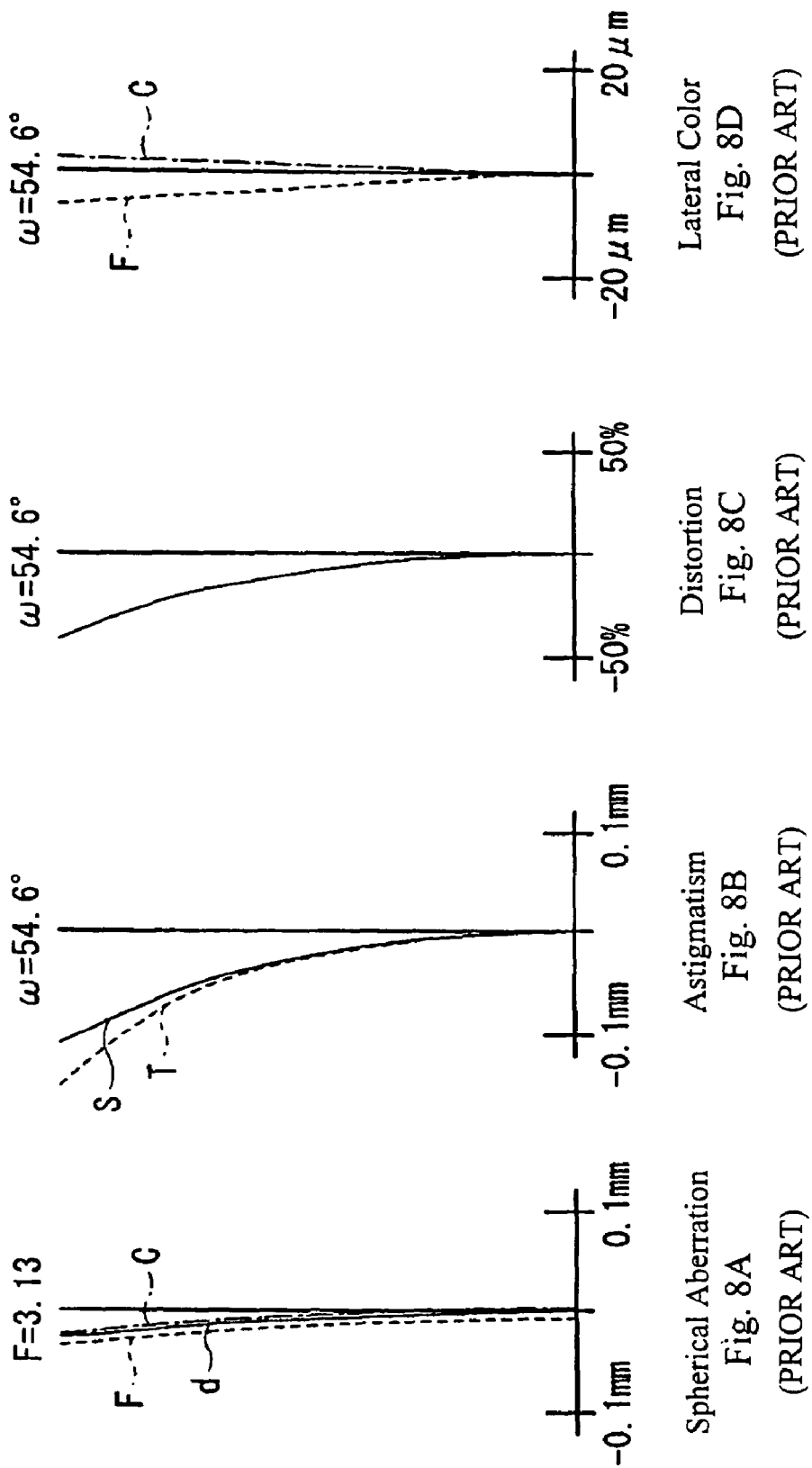
FIGS. 8A–8D show the spherical aberration, astigmatism, distortion, and lateral color, respectively, for the endoscope objective lens shown in FIG. 7; and, FIG. 9 shows the coma as a function of the field angle ω for the endoscope objective lens shown in FIG. 7.

FIGS. 8A–8D show the spherical aberration, astigmatism, distortion, and lateral color, respectively, for the endoscope objective lens of this Prior Art Comparative Example. Each figure indicates the aberration for the d-line as the standard wavelength, and FIGS. 8A and 8D also indicate the specified aberration for the F-line (wavelength: 486.1 nm) and the C-line (wavelength: 656.3 nm). In FIG. 8B, the astigmatism is shown for both the sagittal S and the tangential T image planes.

Figure 9:
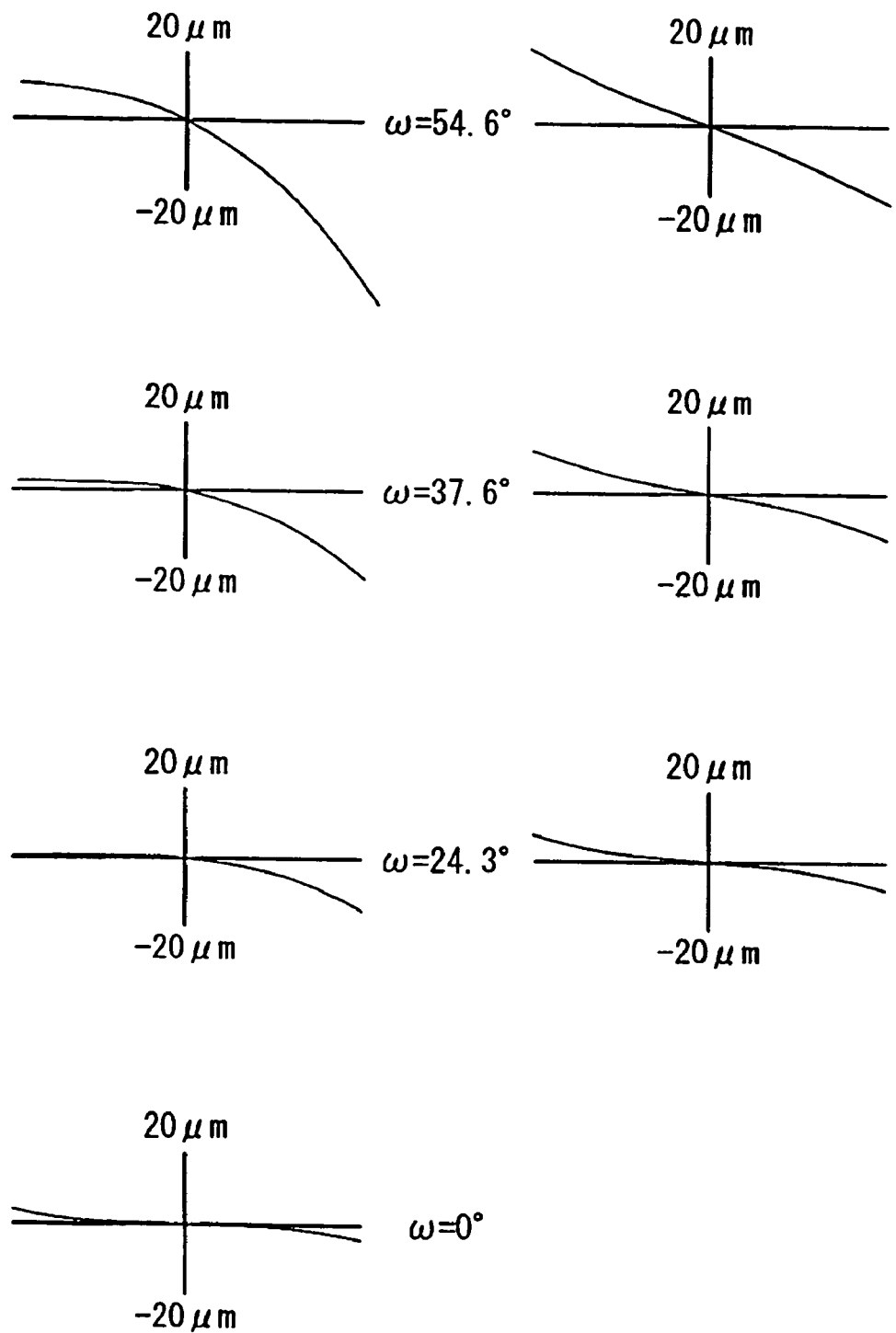

FIG. 9 shows the coma at half-field angles ω of 0, 24.3, 37.6 and 54.6 degrees, for both the tangential image plane (left column) and the sagittal image plane (right column), for this Prior Art Comparative Example. The vertical axis dimension for each curve is in μm. As the coma on axis (ω=0°) is the same for both the tangential and sagittal image planes, only the curve for the tangential image plane is illustrated in the bottom row of the figure. Moreover, the standard wavelength for each aberration curve is the d-line.

As is apparent from viewing Table 5, the endoscope objective lens of the Comparative Example does not satisfy Conditions (1)–(3). Therefore, as shown in FIGS. 8B and 9, sufficient performance is not obtained due to the astigmatism and coma, respectively, being excessive.

The invention being thus described, it will be obvious that the same may be varied in many ways. For example, the radii of curvature for each lens element, the on-axis spacing D of the surfaces, as well as the refractive indexes of the lens elements are not limited to the values given in the Embodiments above, as alternative values are also possible. For example, in Embodiments 1 and 2 above, the first lens element is made to be a plano-concave shape. However, the first lens element may instead be a meniscus shape having a negative refractive power. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. An endoscope objective lens having a three-group, three-lens element construction, comprising, in order from the object side:

a first lens element of negative refractive power and either a meniscus or a plano-concave shape with its concave surface on the image side;

a stop;

a second lens element of positive refractive power and a plano-convex shape with its convex surface on the image side;

a third lens element of positive refractive power and a plano-convex shape with its convex surface on the object side;

wherein the image-side surface of the third lens element makes contact with an end surface of an optical fiber bundle, a surface of an image detector, or a cover glass for an image detector;

the stop is positioned on or in contact with the object-side surface of the second lens element; and the following conditions are satisfied $$2.00 < |f1/f| < 3.00$$

$$2.50 < |f1/D2| < 7.50$$

$$|D3/R4| < 1.00$$

where, f1 is the focal length of the first lens element, f is the focal length of the endoscope objective lens, D2 is the on-axis spacing between the first lens element and the second lens element, D3 is the center thickness of the second lens element, and R4 is the radius of curvature of the image-side surface of the second lens element.

2. The endoscope objective lens according to claim 1, wherein the following condition is satisfied:

$$nd1 > 1.80$$

where nd1 is the refractive index at the d-line of the first lens element.

3. The endoscope objective lens according to claim 1, wherein the first lens element is formed by a molding process.

4. The endoscope objective lens according to claim 2, wherein the first lens element is formed by a molding process.

5. The endoscope objective lens according to claim 1, wherein the second and third lens elements are formed by a grinding process.

6. The endoscope objective lens according to claim 2, wherein the second and third lens elements are formed by a grinding process.

7. The endoscope objective lens according to claim 3, wherein the second and third lens elements are formed by a grinding process.

8. The endoscope objective lens according to claim 4, wherein the second and third lens elements are formed by a grinding process.

* * * * *